United States Patent
Guilloux (10) Patent No.: US 7,775,657 B2
(45) Date of Patent: Aug. 17, 2010

(54) METHOD FOR DEFINING A SUPPLEMENTARY FACE FOR SPECTACLES

(75) Inventor: Cyril Guilloux, Paris (FR)

(73) Assignee: Essilor International (Compagnie Générale d'Optique), Charenton Cedex (FR)

(*) Notice: Subject to any disclaimer, the term of this patent is extended or adjusted under 35 U.S.C. 154(b) by 0 days.

(21) Appl. No.: 11/779,908

(22) Filed: Jul. 19, 2007

(65) Prior Publication Data

US 2008/0013038 A1 Jan. 17, 2008

Related U.S. Application Data

(63) Continuation of application No. PCT/FR2006/000276, filed on Feb. 7, 2006.

(51) Int. Cl.
*G02C 7/08* (2006.01)
(52) U.S. Cl. .................. 351/57; 351/169; 351/178
(58) Field of Classification Search .................. 351/47, 351/48, 57, 58, 163, 168, 169, 172, 178
See application file for complete search history.

(56) References Cited

U.S. PATENT DOCUMENTS

| | | | |
|---|---|---|---|
| 3,305,294 A | 2/1967 | Alvarez | |
| 4,854,689 A | 8/1989 | Dufour et al. | |
| 5,270,745 A | 12/1993 | Pedrono | |
| 5,272,495 A | 12/1993 | Pedrono | |
| 5,488,442 A | 1/1996 | Harsigny et al. | |
| 5,493,348 A | 2/1996 | Herald, Jr. et al. | |
| 5,499,063 A | 3/1996 | Butler et al. | |
| 5,598,232 A | 1/1997 | Pronesti | |
| 5,644,374 A | 7/1997 | Mukaiyama et al. | |
| 5,694,192 A | 12/1997 | Lucki et al. | |
| 5,724,118 A | 3/1998 | Krebs | |

(Continued)

FOREIGN PATENT DOCUMENTS

EP 0 578 833 1/1994

(Continued)

OTHER PUBLICATIONS

P. Allione et al., "Application of optimization in computer-aided ophthalmic lens design", *SPIE Proceedings*, vol. 3737, pp. 138-148, Merkle Editor, Berlin (May 1999).

(Continued)

*Primary Examiner*—Huy K Mai
(74) *Attorney, Agent, or Firm*—Hensley Kim & Holzer, LLC (57) ABSTRACT

A method for defining a supplementary face for spectacles (or clip-on), comprising the steps of: i) choice of a lens suited to the wearer's prescription; ii) modelization of the position of the chosen lens and of the position of a supplementary face in front of the chosen lens; iii) choice of an optical function for the assembly of the chosen lens and supplementary face; iv) calculation of the characteristics of the supplementary face by optical optimization for a standard wearer, using the chosen optical function as optimization target. A supplementary face for spectacles, having: i) a detachable mounting device, suited to the detachable mounting of the supplementary face in front of a lens mounted in the spectacles; ii) a surface at least equal to the surface of the lens and iii) a continuous optical power variation over this surface.

11 Claims, 10 Drawing Sheets

U.S. PATENT DOCUMENTS

| | | | |
|---|---|---|---|
| 5,737,054 A | 4/1998 | Chao | |
| 5,774,200 A | 6/1998 | Markey | |
| 5,790,230 A | 8/1998 | Sved | |
| 5,880,805 A | 3/1999 | Naessens et al. | |
| 5,907,384 A * | 5/1999 | Kirsch et al. | 351/48 |
| 6,027,214 A | 2/2000 | Graham | |
| 6,116,734 A | 9/2000 | Pedrono et al. | |
| 6,244,705 B1 * | 6/2001 | Ledbetter et al. | 351/57 |
| 6,318,859 B1 | 11/2001 | Baudart et al. | |
| 6,412,942 B1 | 7/2002 | McKenna et al. | |
| 6,474,810 B1 | 11/2002 | Ng | |
| 6,547,703 B1 | 4/2003 | Swezey et al. | |
| 6,893,124 B1 * | 5/2005 | Kurtin | 351/57 |
| 7,316,478 B2 * | 1/2008 | Periasamy et al. | 351/57 |

FOREIGN PATENT DOCUMENTS

| | | |
|---|---|---|
| EP | 0 990 939 | 4/2000 |
| FR | 2 444 955 | 7/1980 |
| FR | 2 588 973 | 4/1987 |
| FR | 2 683 642 | 5/1993 |
| FR | 2 699 294 | 6/1994 |
| FR | 2 704 327 | 10/1994 |
| FR | 2 769 997 | 4/1999 |
| GB | 2 038 020 | 7/1980 |
| GB | 2 277 997 | 11/1994 |
| JP | 63-254415 | 10/1988 |
| WO | WO 98/12590 | 3/1998 |
| WO | WO 01/81987 | 11/2001 |

OTHER PUBLICATIONS

Carl de Boor, "A Practical Guide to Splines", *Applied Mathematical Sciences 27*, Springer-Verlag, New York, pp. 333-359 (1978).

R. Navarro et al., "Accommodation-dependent model of the human eye with aspherics", *J. Opt. Soc. Am. A*, vol. 2, No. 8, pp. 1273-1281 (August 1985).

* cited by examiner

METHOD FOR DEFINING A SUPPLEMENTARY FACE FOR SPECTACLES

CROSS REFERENCE TO RELATED APPLICATION

This application is continuation and claims benefit under 35 U.S.C. §120 of PCT International Application No. PCT/FR06/000276, which designates the United States, was filed Feb. 7, 2006 and published as WO 2006/084986 A1 on Aug. 17, 2006, and which claims priority to French Patent Application No. 05 01 245 filed Feb. 8, 2005. The contents of the prior application is incorporated herein by reference in its entirety.

TECHNICAL FIELD

This disclosure relates to supplementary or "clip-on" faces for spectacles. In the description below, a supplementary face for spectacles, i.e. a detachable assembly formed by a support and lenses, intended to be attached to a spectacle frame is designated by the term "clip-on". When such a clip-on is mounted on a frame, the clip-on lenses are arranged in front of the lenses mounted in the spectacle frame. Such clip-ons are in particular proposed for providing sun protection to wearers of non-tinted spectacles.

BACKGROUND

Various solutions exist for ensuring the detachable mounting of clip-ons on spectacle frames. Thus, magnetic-type solutions are described in U.S. Pat. No. 5,737,054, U.S. Pat. No. 6,547,703 and U.S. Pat. No. 6,412,942. Mechanical-type solutions are described in U.S. Pat. No. 6,474,810, U.S. Pat. No. 5,774,200, U.S. Pat. No. 5,724,118, U.S. Pat. No. 5,694,192, U.S. Pat. No. 5,493,348 and U.S. Pat. No. 5,790,230.

Clip-ons have been proposed in order to meet the needs of particular presbyope wearers, such as radiologists, aircraft pilots or others. These wearers need zones of vision different from the standard zones used for progressive lenses—near vision at the bottom of the lens, far vision at the top of the lens. For example, aircraft pilots need a near vision zone at the top of the lens, in order to be able to look at dials situated high up in the cabin.

WO-A-01 81987 proposes equipment intended for presbyope wearers, needing to look at near or intermediate points in the object space through the part of progressive or multifocal lenses which corresponds to intermediate vision or far vision. This document proposes to add to a spectacle frame a support with additional positive power lenses, extending over the upper part of the spectacle lenses. The additional lenses are bifocal or have a power variation. The additional lenses given by way of example are defined solely by their power in the bottom part and in the top part. A first example relates to an additional lens having an additional power of one dioptre in the lower part and an additional power of 0.25 dioptre in the upper part. A second example relates to an additional lens having an additional power of 0.25 dioptre in the lower part and an additional power of one dioptre in the upper part. The additional lenses and their shape have the effect of generating a significant discontinuity in the wearer's optical function at the lower part of the lens. A simulation carried out with a Varilux Panamic type progressive lens with nil base and with addition of 2 dioptres produces the following results. For an additional monofocal lens with a power of one dioptre, the optical function of the Varilux Panamic and additional lens assembly exhibits, along the meridian, a sudden discontinuity of more than one dioptre, when the gaze passes on the lower edge of the additional lens. For an additional lens with power varying from one dioptre in the upper part to 0.25 dioptre in the lower part, the optical function of the Varilux Panamic and additional lens assembly exhibits, along the meridian, a sudden discontinuity of the order of 0.75 dioptre, when the gaze passes on the lower edge of the additional lens. The simulation shows moreover that the peripheral aberrations of the clip-on and the lens unfortunately combine in the optical zone modified by the clip-on. The peripheral aberrations of the assembly are therefore more pronounced than the peripheral aberrations of the initial lens.

U.S. Pat. No. 6,027,214 proposes clip-ons with local correction zones, dedicated to particular applications. This document does not specify the nature of the correction zones. U.S. Pat. No. 5,880,805 proposes a clip-on the upper two-thirds of which are clear (zero power) and the lower third of which has a power of one dioptre or more. U.S. Pat. No. 6,244,705 proposes a clip-on extending over the upper part of the lens in the frame, with a constant power value. U.S. Pat. No. 5,598,232 proposes a device making it possible to superimpose on the near vision zone of a bifocal lens a lens shaped like this near vision zone, of negative power; it is thus possible to pass from a bifocal lens to a lens having a uniform power suitable for far vision.

These different documents identify the particular problems of certain presbyope wearers. However, they only propose solutions based on somewhat unsatisfactory approximations. In fact, in the superimposing of the clip-on and the lens, both the clip-on and the lens are considered as thin lenses. Moreover, for the calculation, these clip-ons do not take account of the optical characteristics formed by the "initial lens", such as for example the distribution of the power and the aberrations which constitute the optical design. These clip-ons therefore approximate to the resulting optics of the lens and clip-on assembly. In terms of comfort for the wearer, these solutions are not satisfactory.

Moreover, in order to establish an optical prescription, ophthalmologists generally use combinations of lenses which are superimposed in front of the wearer.

SUMMARY

In a first aspect, disclosed is a method for defining a supplementary face for spectacles (or clip-on), comprising the steps of:
  choice of a lens suited to the wearer's prescription;
  modelization of the position of the chosen lens and of the position of a supplementary face in front of the chosen lens;
  choice of an optical function for the assembly of the chosen lens and supplementary face;
  calculation of the characteristics of the supplementary face by optical optimization for a standard wearer, using the chosen optical function as optimization target.

In one embodiment, the calculation step is carried out by optimization of one surface of the supplementary face. In this case it can be envisaged that the optimized surface is the surface of the supplementary face adjacent to the lens. It is also possible for the surface of the supplementary face other than the optimized surface to be spherical.

Also disclosed is a supplementary face for spectacles, having:
  a detachable mounting device, suited to the detachable mounting of the supplementary face in front of a lens mounted in the spectacles;
  a surface at least equal to the surface of the lens and
  a continuous optical power variation over this surface.

The supplementary face can have a thickness in the centre which is less than or equal to 2.5 mm and/or a surface treatment on at least one of its surfaces.

Finally, disclosed is a combination of such a supplementary face and a lens suited to being mounted in spectacle frames.

In such a combination, it can be provided that:

the lens has an optical or geometric centre;

the supplementary face has a spherical rear surface having a sphere equal to the sphere of the front face of the lens at said centre.

Other characteristics and advantages of the invention will become apparent on reading the following detailed description of the embodiments of the invention, given by way of example only and with references to the drawings.

DETAILED DESCRIPTION

Disclosed is a clip-on which is intended to be mounted on a progressive lens. The clip-on covers the whole of the surface of the progressive lens on which it is mounted and exhibits no discontinuity over this surface.

In a manner known per se, the term progressive lens is used to refer to lenses intended for presbyope wearers, which have a far vision zone in the upper part of the lens, a near vision zone in the lower part of the lens and a power addition from the upper part to the lower part of the lens. Such lenses are for example described in FR-A-2 699 294, U.S. Pat. No. 5,270,745 or U.S. Pat. No. 5,272,495, FR-A-2 683 642, FR-A-2 699 294 or also FR-A-2 704 327. They are generally determined by optimization, starting from a certain number of constraints imposed on the different characteristics of the lens. These lenses are all-purpose lenses in that they are suited to the different needs of the wearer at the time.

The term specialized lens is used to refer to a lens having a power progression, which is dedicated to a particular activity or to a particular prescription. Such lenses are for example described in FR-A-2 588 973, which proposes lenses intended for young presbyopes; these lenses are prescribed only as a function of the power necessary for the wearer in near vision, independently of the power necessary for the wearer in far vision. FR-A-2 769 997 proposes specialized lenses, providing the wearer with the advantages of a unifocal lens in near vision, with moreover an intermediate vision. The French Patent Application filed on 3 Jun. 2004 under number 04 06002 and entitled Lentille ophtalmique [Ophthalmic Lens] describes a lens providing the wearer with the advantages of a unifocal lens in far vision, with moreover an intermediate vision; such a lens is in particular suitable for driving a car.

The clip-on of the invention ensures a conversion of the optical function of the progressive lens on which it is mounted. Since the clip-on covers the whole of the surface of the progressive lens, it ensures that the wearer of the assembly has an optical function modified over the whole of the field of vision of the progressive lens. Moreover, since the clip-on has no discontinuity, it generates no discontinuity in the optical function provided to the wearer of the progressive lens and clip-on assembly. The wearer has a continuous optical function modified by the clip-on, over the whole vision field provided by the progressive lens. By continuous optical function or absence of discontinuity is here meant the fact that the optical parameters in question are continuous functions of the direction of viewing. This applies in particular to the optical power, and consequently to the other optical parameters of the lens.

Unlike the solutions of the prior art, which are based on an approximation of the resulting dioptrics of the assembly formed by lens and clip-on, the solution of the invention makes it possible to take into consideration the optical properties of the clip-on and lens combination. This consideration makes it possible to improve the result obtained for the wearer. Moreover, the use of the optical properties of the clip-on and lens combination makes it possible to offer the wearer more diverse solutions than in the prior art.

In a manner known per se, at any point of an aspherical surface, a mean sphere D given by the formula:

$$D = \frac{n-1}{2}\left(\frac{1}{R_1} + \frac{1}{R_2}\right)$$

is defined, where R1 and R2 are the maximum and minimum local radii of curvature expressed in metres, and n is the index of the material constituting the lens.

A cylinder C, given by the following formula:

$$C = (n-1)\left|\frac{1}{R_1} - \frac{1}{R_2}\right|$$

is thus defined.

The mean sphere and the cylinder are surface parameters.

Figure 1:
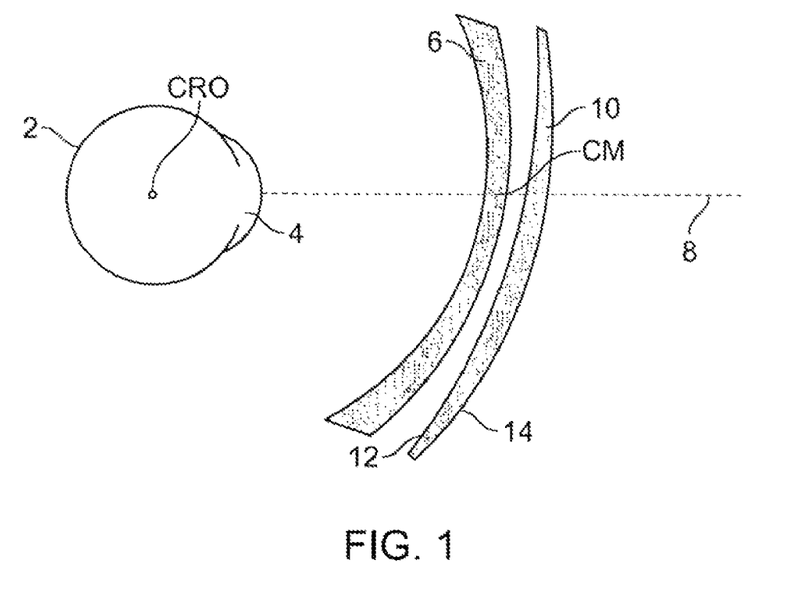
FIG. 1, a diagrammatic representation of an eye-lens system.

FIG. 1 shows a diagrammatic representation of a lens-eye system, in vertical section. The eye 2 is modelled by a centre of rotation, denoted CRO in the figure, a radius and a pupil 4. A model of the eye is for example proposed in *Accommodation-dependent model of the human eye with asphericals*, R.

Navarre, J. Santamaria and J. Bescos, Vol. 2, No 8/August 1985, Opt. Soc. Am. A.; usually, the position of the eye is defined by two angles α and β, representative of the vertical and horizontal rotations of the eye with respect to the primary direction of viewing. A lens 6 is positioned in a frame, in front of the eye. The positioning of the lens in front of the eye is usually defined by the parameters: distance from the eye's centre of rotation to the rear surface—CRO-lens distance—angle of inclination of the lens to the vertical or pantoscopic angle and angle of inclination to the horizontal or curving contour angle. Generally, it is possible to use values of 27 mm, 12° and 0° for the CRO-lens distance, the angle of inclination and the curving contour. The lens is mounted respecting the alignment of the primary direction of viewing with a fitting cross situated on the lens; this is represented in FIG. 1, where the primary direction of viewing 8 and the fitting cross CM have been plotted on the front surface of the lens.

FIG. 1 also shows a clip-on 10 arranged in front of the lens 6, with a front surface 14 and a rear surface 12. The detachable device for mounting the clip-on on the frame is not shown in the figure. This device can comprise one or more of the existing solutions described in the abovementioned prior art.

An ergorama, which represents a space model, is defined for a wearer. For each direction of viewing, i.e. for each pair (α, β), the ergorama provides an object proximity. For more details on the construction of an ergorama, the document WO-A-98 12590 (U.S. Pat. No. 6,318,859) can be consulted. A meridian is then defined as all of the pairs (α, β) of the positions of the eye when the wearer looks through the lens at the points on the sagittal plane for distances given by the ergorama.

Given the ergorama, a model of the eye and the position of the lens, optical parameters of the lens can be calculated, as explained for example in the Application EP-A-O 990 939 with reference to FIGS. 1 to 3, or also in the Application WO-A-98 12 590 (U.S. Pat. No. 6,318,859) with reference to FIG. 1. Specifically, a sphere of the vertices is defined as the sphere centred on the eye's centre of rotation and tangential to the lens at the fitting cross. For a direction of viewing (α, β), an object point M at an object distance given by the ergorama is considered. The points S and T between which the image of the object forms are determined. The ray passing through the centre of rotation of the eye and the point M intersects the sphere of the vertices at a point J. The image proximity IP is then given by $$IP = \frac{1}{2}\left(\frac{1}{JT} + \frac{1}{JS}\right)$$

while the object proximity OP is the reciprocal of the distance between the point M and the point J of the sphere of the vertices. The power is defined as the sum of the object and image proximities, i.e.

$$P = OP + IP = \frac{1}{MJ} + \frac{1}{2}\left(\frac{1}{JT} + \frac{1}{JS}\right)$$

The amplitude of the astigmatism is given by:

$$A = \left|\frac{1}{JT} - \frac{1}{JS}\right|$$

The angle of the astigmatism is the angle measured in a reference linked to the eye, relative to the horizontal direction, with which the image T forms, in the vertical plane linked to the eye. These definitions of power and of astigmatism are optical definitions, under wearing conditions and in a reference linked to the eye. Qualitatively, the thus-defined power and astigmatism correspond to the characteristics of a thin lens, which, fitted instead of the lens in the direction of viewing, provides the same images locally. It is noted that, in the primary direction of viewing, the definition provides the standard value of the astigmatism.

The thus-defined power and astigmatism can be experimentally measured on the lens using a frontofocometer; they can also be calculated by ray tracing under wearing conditions.

Figure 5:
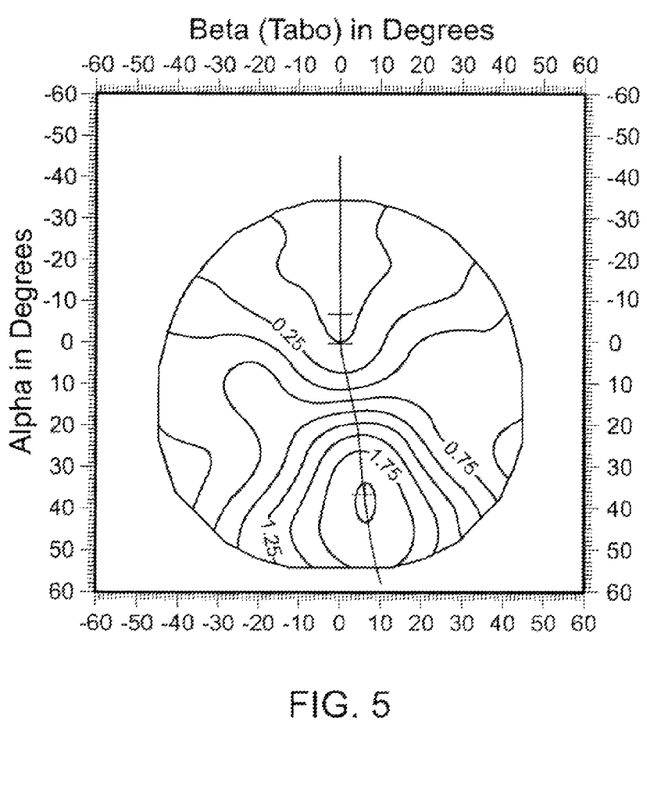
FIG. 5, a map of the average wearer's power for the progressive lens of FIG. 4.
Figure 6:
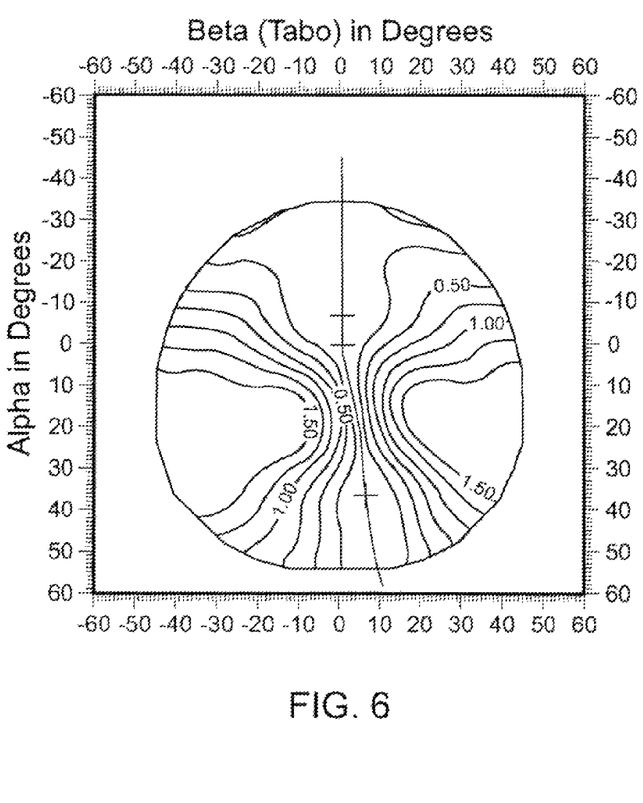
FIG. 6, a map of the resulting astigmatism for the progressive lens of FIG. 4.

Using these parameters, the optical function of a lens is defined by the power and of astigmatism values for all of the directions of viewing, as represented for example in FIGS. 5 and 6.

Consider the example of a progressive lens intended for a presbyope wearer; the lens has a far vision reference point, conventionally denoted VL and a near vision reference point, conventionally denoted VP. Between these two points, the lens has an intermediate vision zone conventionally denoted VI; this intermediate vision zone links a far vision zone containing the point VL and a near vision zone containing the point VP. The lens is suited to a presbyope wearer whose prescription is SVL, CVL and AVL (sphere, cylinder and axis) in far vision, and SVP, CVP and AVP in near vision. In general, the nominal addition ADD is given by the difference SVP−SVL between the sphere prescribed in far vision and the sphere prescribed in near vision; the astigmatism prescription—cylinder and axis—is identical in far vision and in near vision, being written CVP=CVL and AVP=AVL. The mean power correction is then SmVL=SVL+CVL/2 in far vision and SmVP=SVP+CVP/2=SmVL+ADD in near vision.

Figure 2:
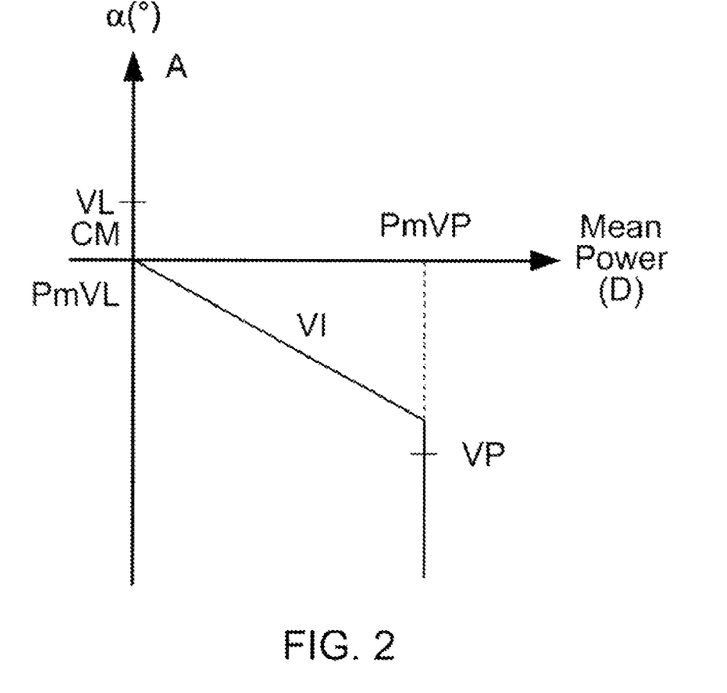
FIG. 2, a diagrammatic mean-power optical profile of a progressive lens under wearing conditions.

FIG. 2 shows a diagrammatic mean power optical profile of a progressive lens; the power of the lens is plotted on the graph of FIG. 2 along the x-axis and the lowering of the gaze or angle α along the y-axis. As the figure shows, the optical power is substantially constant for directions of viewing above the primary direction of viewing, i.e. for negative values of the angle α with the notations proposed here. The optical power has the value PmVL related to the abovementioned correction SmVL. When the direction of viewing is lowered, the optical power increases to reach a substantially constant value in the near vision zone, which has the value PmVP related to SmVP discussed above. The values of the a angles for the fitting cross as well as for the reference points VL and VP for far vision and for near vision were plotted on the graph.

Figure 3:
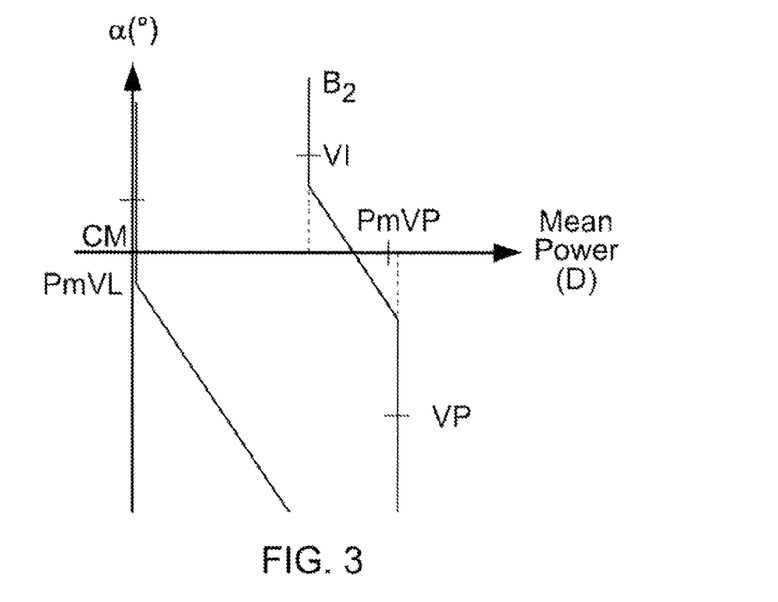
FIG. 3, diagrammatic mean-power optical profiles of specialized lenses.

FIG. 3 shows, with the same notations, diagrammatic mean power optical profiles of specialized lenses; on the left side of the figure the profile of a specialized lens dedicated to driving a car is represented. As FIG. 3 shows, the lens has a far vision zone which extends lower than a progressive lens of the kind of that in FIG. 2. In the lower part of the specialized lens, the power increases in order to ensure intermediate vision. The specialized lens has no near vision zone. On the right side of the figure, the profile of a specialized lens dedicated to working on a computer is represented. With respect to the profile represented in FIG. 2, the specialized lens has in its upper part, above the point VL of the standard progressive lens, a zone of power which is constant but greater in value relative to that necessary for the correction of the wearer's far vision; this zone allows intermediate vision. In its lower part, the specialized lens has a near vision zone, arranged a little higher than the near vision zone of a standard progressive lens. Such an optical profile is described in more detail in the Patent Application FR-A-2 769 997.

Figure 4:
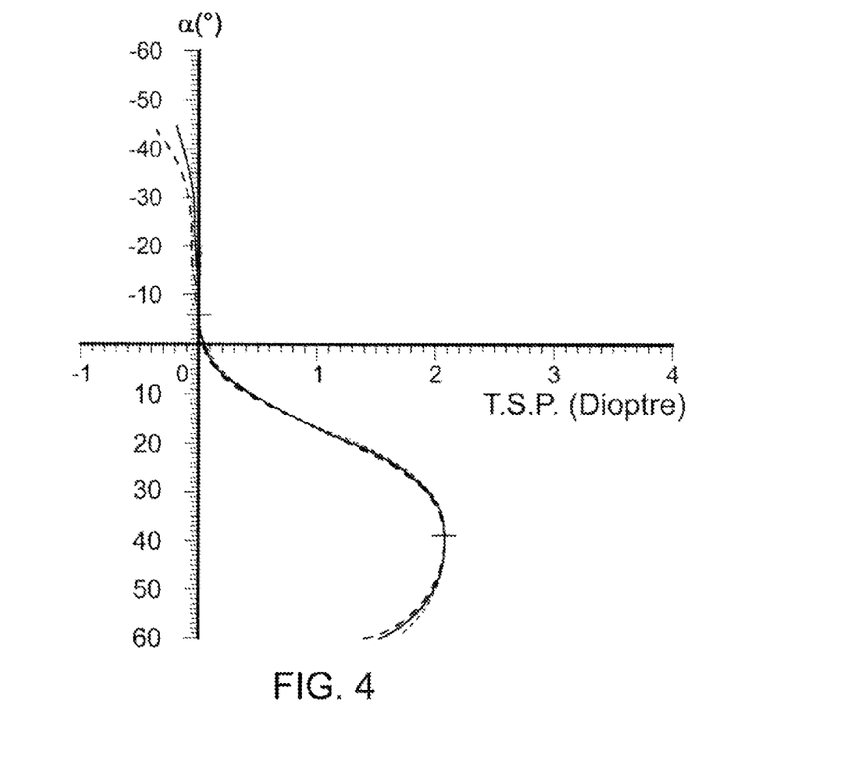
FIG. 4, a wearer's power graph along the meridian, for a progressive lens of the prior art.

FIGS. 4 to 6 show the optical characteristics of a progressive lens of the prior art; it is a lens formed from a surface of the type sold by the Applicant under the reference Varilux Panamic and commonly used for a plane prescription with addition of 2.00 dioptres. The lens chosen by way of example has a mean power in far vision of zero dioptre and a nominal addition of 2 dioptres. FIG. 4 shows a wearer's power graph along the meridian, for a progressive lens of the prior art; the angle α is represented along the y-axis and the optical power along the x-axis. This graph shows the T, S and P values along the meridian, in dioptres. The profile of FIG. 4 is of the type diagrammatically represented in FIG. 2. FIG. 5 shows a wearer's power map, for the progressive lens of FIG. 4; the angle β of rotation of the eye about a vertical axis passing through the centre of rotation of the eye is represented along the x-axis; the angle α of rotation of the eye about a horizontal axis passing through the centre of rotation of the eye is represented along the y-axis. FIG. 5 shows the lines of the same wearer's power, in 0.25 dioptre graduations for the different values of the pair (α, β). The figure shows the far vision zone—in the top part of the lens above the wearer's power 0.50 dioptre line; the near vision zone in the bottom part of the lens about the near vision reference point is also shown. The figure also shows the fitting cross, for values (0, 0) of the pair (α, β), the far vision reference point, for a value of α of the order of 8° above the fitting cross and a value of β of zero. Finally, the near vision reference point, which is shifted on the nasal side of the lens, is plotted in the figure. FIG. 6 shows, with the same notations, a map of the resulting astigmatism, for the progressive lens of FIG. 4; once again, the resulting isoastigmatism lines are represented with a step of 0.25 dioptre. The lens has a thickness in the centre of 2.53 mm; at the far vision reference point, the lens has a mean power of −0.04 dioptre and a resulting astigmatism of 0.01 dioptre. At the near vision reference point, the mean power is 2.02 dioptres and the resulting astigmatism is 0.03 dioptres.

Figure 7:
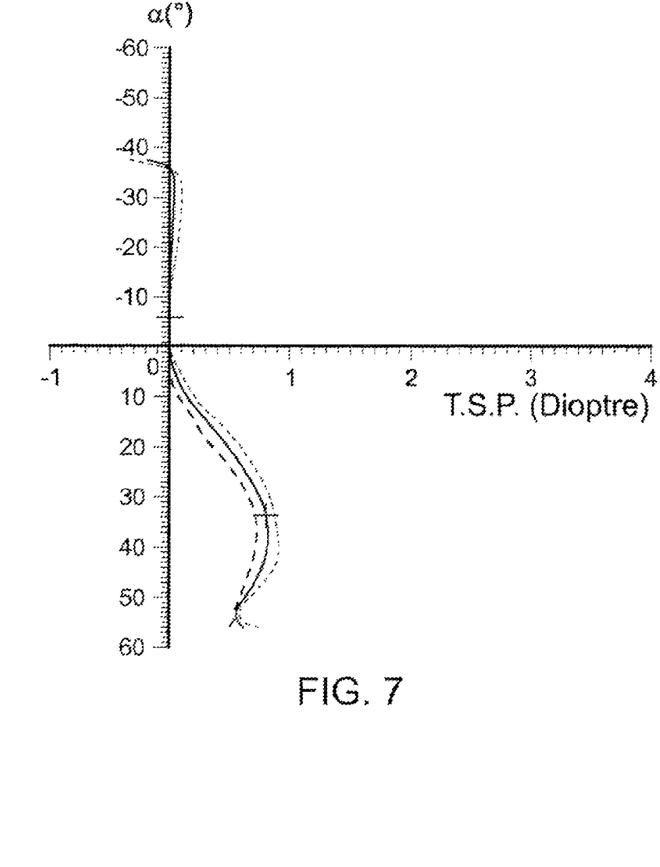
FIGS. 7 to 9, a graph and maps similar to those of FIGS. 4 to 6, for a first specialized lens of the prior art.
Figure 8:
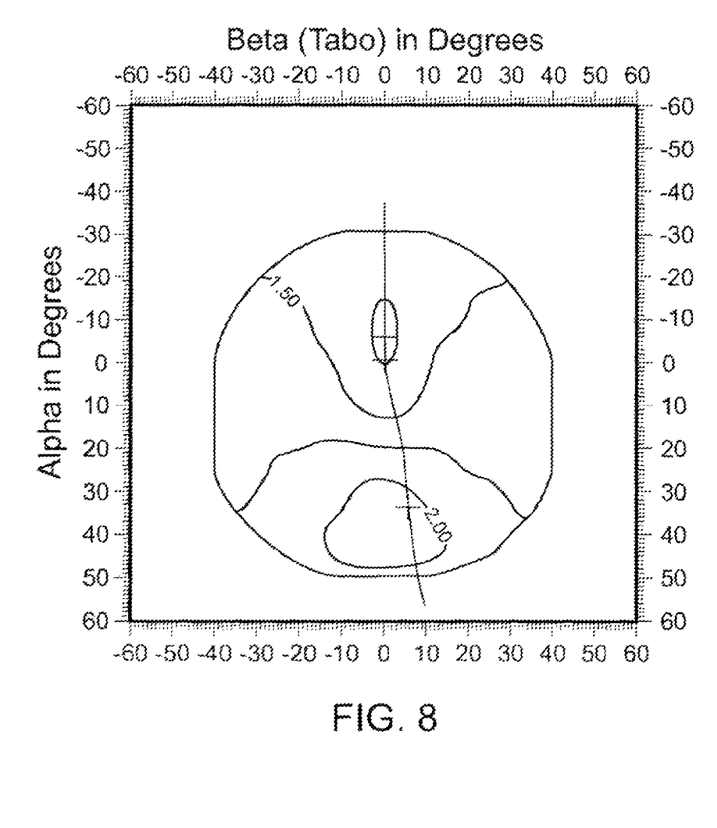
Figure 9:
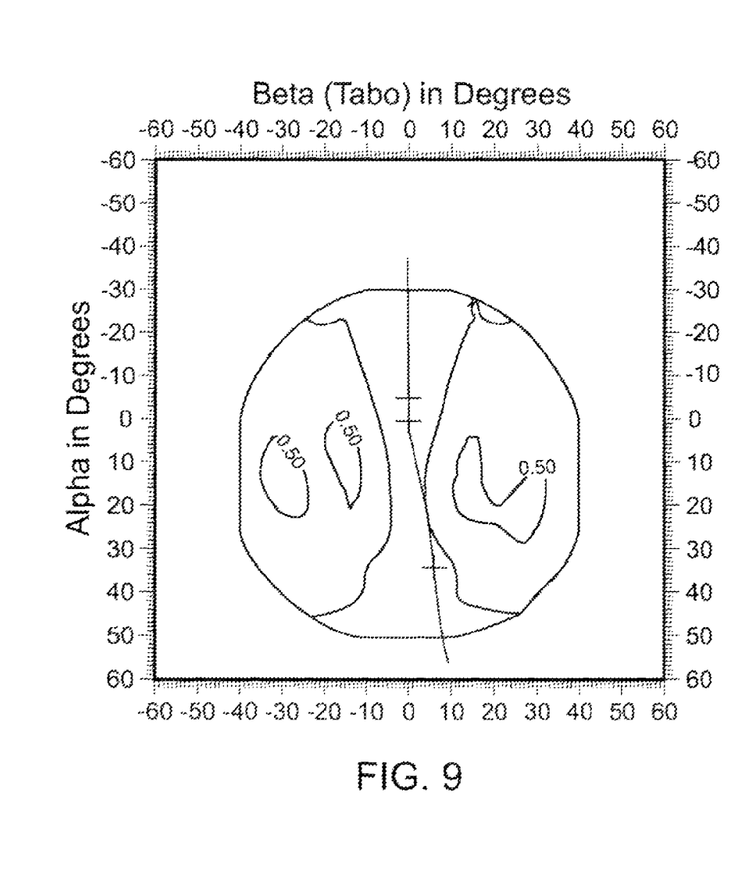

FIGS. 7 to 9 show a graph and maps similar to those of FIGS. 4 to 6, for a first specialized lens of the prior art; FIG. 7 shows a profile of the type represented on the right side of FIG. 3. The first specialized lens is a lens intended for work in intermediate vision, suited to a wearer having a prescription with a 2.00 dioptres addition. The wearer's power progression on the specialized lens is equivalent to 0.80 dioptre and is less than the wearer's addition prescription. The isopower and isoastigmatism maps show lines separated by 0.25 dioptre. The lens has a thickness in the centre of 2.20 mm; at the level of the intermediate vision—the position of which is approximately 6° above the centre—the lens has a mean power of 1.22 dioptres and a resulting astigmatism of 0.01 dioptre. At the level of the near vision, the mean power is 2.08 dioptres and the resulting astigmatism is 0.15 dioptre.

Figure 10:
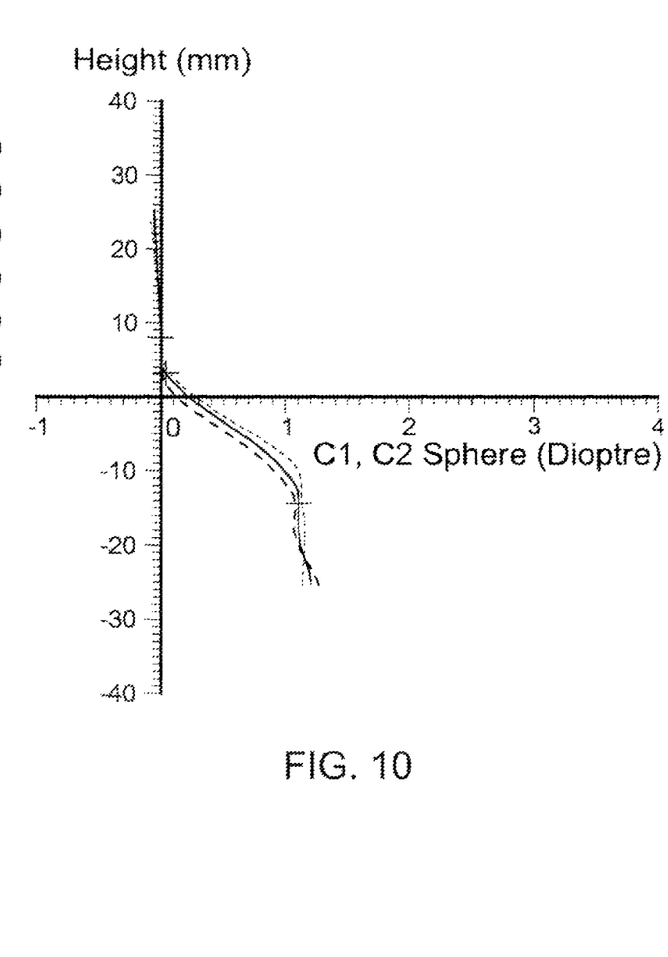
FIG. 10, a mean sphere graph along the meridian for the rear surface of a first clip-on according to the invention, making it possible to convert the optical function of the progressive lens of FIGS. 4 to 6 to that of the first specialized lens of FIGS. 7 to 9.
Figure 11:
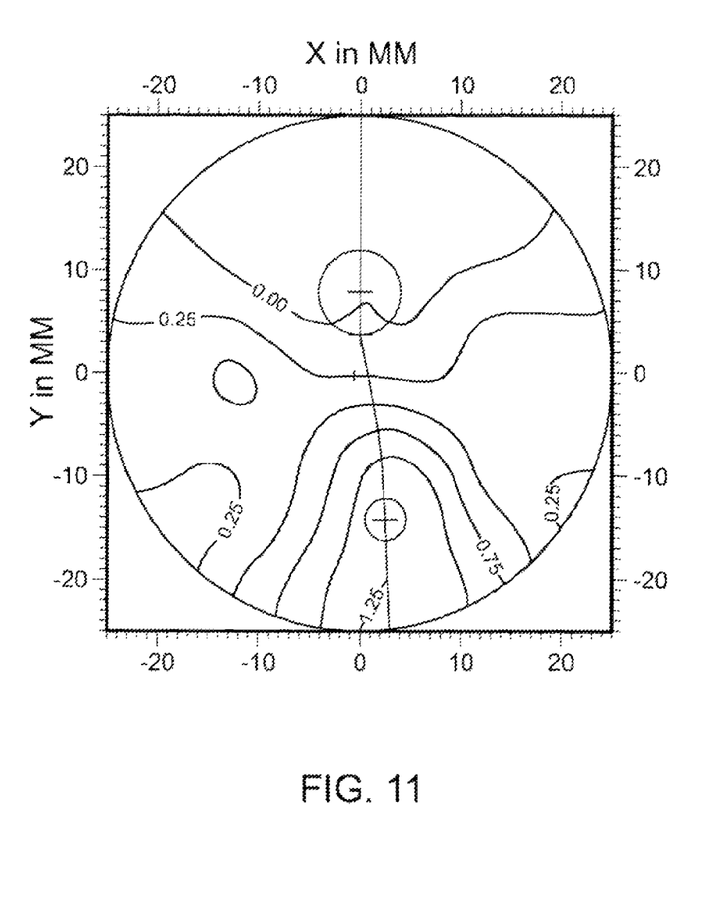
FIGS. 11 and 12, mean sphere and cylinder maps of the rear surface of the clip-on of FIG. 10.
Figure 12:
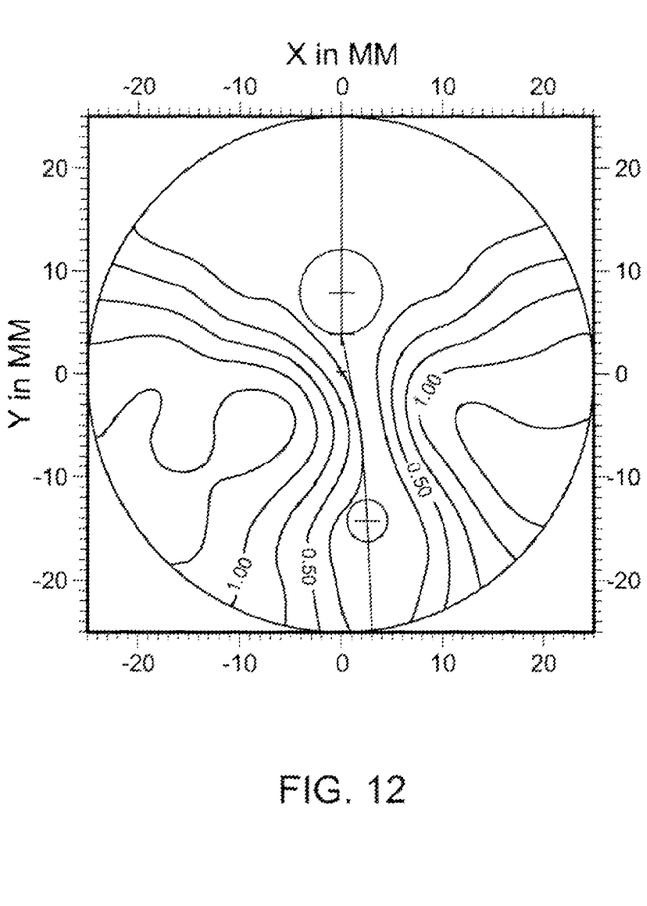

FIGS. 10 to 12 show the characteristics of the rear surface of a first clip-on according to the invention, making it possible to convert the optical function of the progressive lens of FIGS. 4 to 6 to that of the first specialized lens of FIGS. 7 to 9. The clip-on has a spherical front surface and an afocal rear surface. The rear surface is optimized in order to ensure the optical function required for the assembly of the lens and the clip-on mounted on the lens. FIG. 10 shows a graph of the mean sphere along the meridian for the rear surface of the clip-on; the meridian is defined optically, as above. The figure shows in unbroken lines the mean sphere and in dotted lines the values 1/R1 and 1/R2 of the maximum and minimum curves; these values are plotted in dioptres along the x-axis and are given values relative to the mean sphere at the point situated 8 mm above the centre of the lens. Along the y-axis, the graph is graduated in mm and shows the ordinate on the lens, in an orthonormalized reference the axes (x, y) of which represent the horizontal and the vertical, the plane (x, y) being tangential to the surface of the lens in its centre. The figure shows that the mean sphere in the upper part of the lens is substantially constant, and increases in order to reach a value of the order of 1.20 dioptres in the bottom part of the lens. At the coordinates point (0 mm, 8 mm) on the lens, the mean sphere is 3.53 dioptres and the cylinder is 0.02 dioptres. At the coordinates point (0, 4 mm) in the reference (x, y), the mean sphere is 3.57 dioptres and the cylinder 0.04 dioptre. At the height of the control point for near vision of coordinates (2.561 mm, −14 mm) in the reference (x, y), the mean sphere is 4.75 dioptres and the cylinder is 0.06 dioptre.

The front surface of the clip-on is spherical and has a curvature of 4.74 dioptres. The clip-on is formed from the material referenced Orma supplied by Essilor, with an index of 1.502. The thickness of the clip-on is 1.50 mm.

FIGS. 11 and 12 show mean sphere and cylinder maps of the rear surface of the clip-on of FIG. 10; the coordinates in mm are plotted on the x-axis and y-axis in the abovementioned reference (x, y). The isocylinder and dioptre isosphere lines are drawn in 0.25 dioptre steps.

The clip-on in FIGS. 10 to 12 is obtained by optical optimization of the lens and clip-on assembly, under wearing conditions, as explained below.

The fact of using an optical optimization makes it possible to ensure for the wearer a more precise optical function than that which could be obtained by a simple approximation of the assembly combination, or than that obtained by an optimization of the clip-on independently of the lens on which it is mounted.

The techniques disclosed herein make it possible to convert the basic optical function to an optical function appropriate to the specific need. Unlike the solutions of the prior art described above, the invention ensures control over all of the optical function of the lens and clip-on system, in particular at the periphery of the system.

The optimization can be carried out as follows. To begin with, the lens suited to the prescription of the wearer, in a standard position relative to a model of the eye is considered, as explained with reference to FIG. 1. The clip-on is then arranged in front of the lens; the position of the clip-on with respect to the lens may depend on the system for securing the clip-on to the frame of the lens, if different attachment systems provide different positions of the clip-on relative to the frame or to the lens. Once the clip-on is arranged in front of the lens, the clip-on is defined by optimization, by using the optical function desired for the lens and clip-on assembly as optimization target. This desired optical function can be determined using a description of the space and analysis of the activity. The desired optical function best suited to the activity in question is deduced from this.

The optimization is carried out using ray-plotting software, which makes it possible to determiner the wearer's power and the astigmatism resulting from the lens and clip-on assembly, for a given shape of clip-on. It is also possible to use any other tool known per se which makes it possible to simulate the optical function of an optical system. The optimization is carried out in a manner known per se, by following the optical optimization methods described for example in ALLIONE P., AHSBAHS F., LE SAUX G.: *Application of optimization in computer-aided ophthalmic lens design*, in Design and Engineering of Optical Systems II (Merkle Editor, SPIE Proceedings SERIES Vol. 3737, Berlin 1999), pp. 138-148.

An optical optimization is thus carried out without approximations in the calculation of the clip-on; in particular, unlike the prior art, the thin-lens approximation is not involved. The inputs used in the optimization are precise descriptions of the initial lens and of the desired optical function.

A specific treatment can also be provided on the clip-on if the activity for which the system is intended requires such a treatment. For example, for a lens intended for driving a car or outdoor activities, the clip-on can be provided with a sun treatment or a polarizing treatment. A "contrast-enhancing" treatment for computer screen work or also neutral shading for golf can also be provided. This treatment can be provided on either of the two surfaces of the clip-on. Moreover, the standards, such as those relating to shock resistance, do not apply to the clip-on, which can therefore be not very thick. In the examples below, the clip-on has a thickness of 1.50 mm in the centre; it is more generally advantageous if it has a thickness less than or equal to 2.5 mm.

In the example above, the front surface of the clip-on is spherical and the optimization is carried out on the rear surface of the clip-on. This has the advantage of providing a spherical front surface for the lens and clip-on assembly. It would also be possible to optimize the front surface of the clip-on, or to distribute the optical function over the front surface and over the rear surface of the clip-on. It is also possible to obtain the optical function of the clip-on by other types of optical elements such as diffractive, gradient-index and other elements.

The clip-on disclosed herein is optimized for a given progressive lens. However, it can also be used for other lenses, insofar as they have a power profile along the meridian similar to that of the progressive lens used for the optimization. In the example above, the clip-on is optimized for a lens marketed under the reference Varilux Panamic. The clip-on could also be used for a lens of the type marketed under the reference Varilux Comfort, which has a similar power profile along the meridian and in the vicinity of the latter. Of course, such a use of the same clip-on would only ensure the optical function in the part of the Varilux Comfort lens which has an optical function similar to that of the Varilux Panamic lens. This being an approximation, it is therefore preferable, as far as possible to provide a function optimization of the initial lens, with which the clip-on is optimized.

Figure 13:
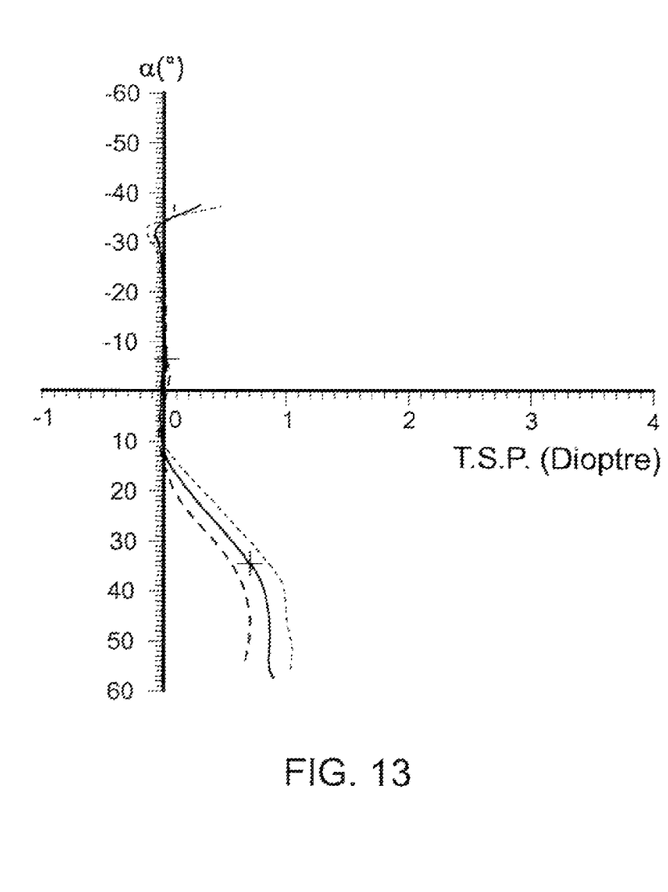
FIGS. 13 to 15, a graph and maps similar to those of FIGS. 4 to 6, for a second specialized lens of the prior art.
Figure 14:
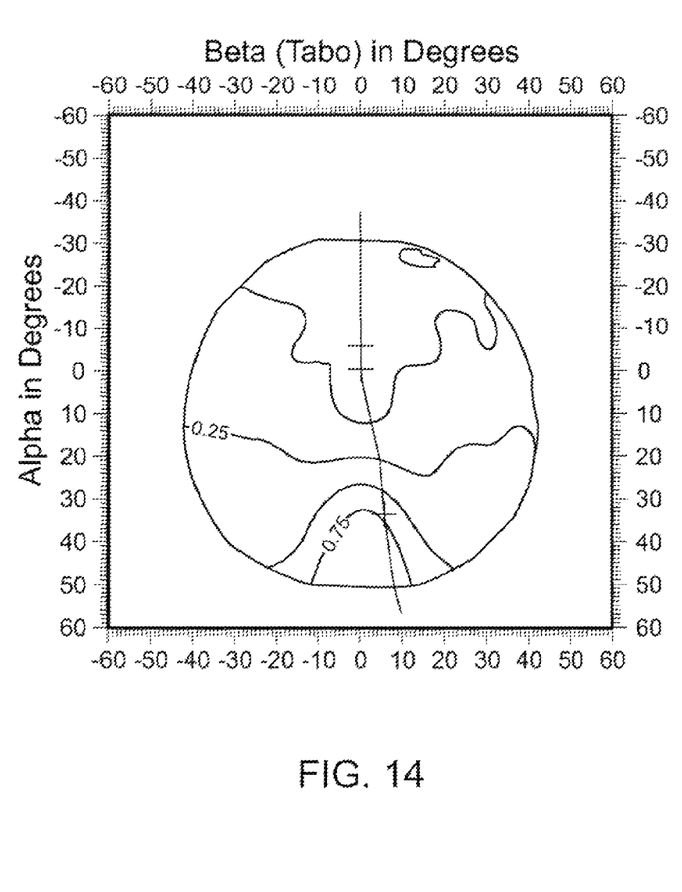
Figure 15:
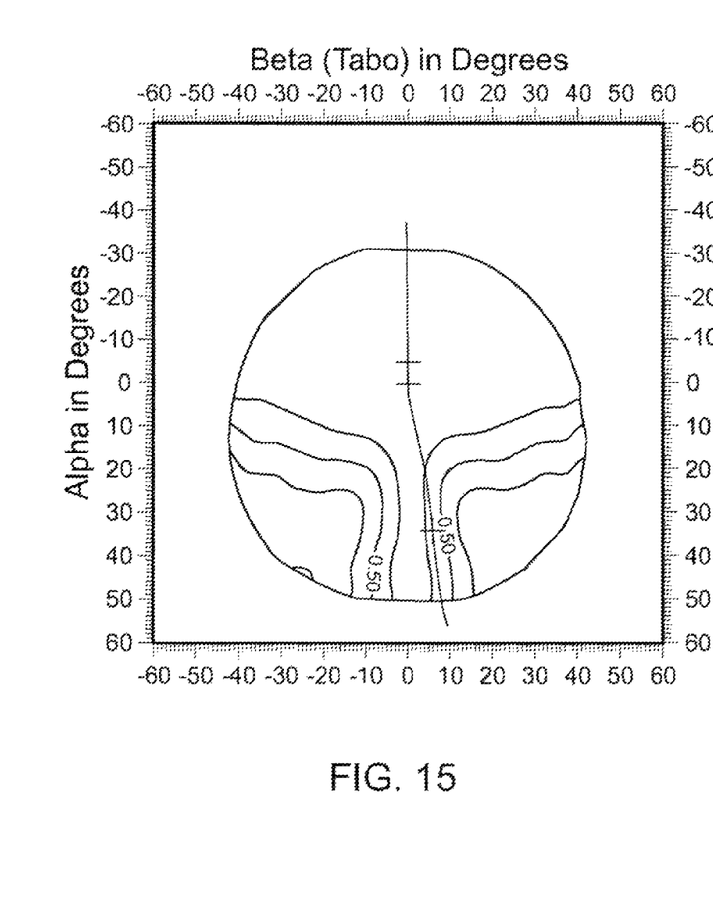

FIGS. 13 to 15 show a graph and maps similar to those of FIGS. 4 to 6, for a second specialized lens of the prior art. The lens of FIGS. 13 to 15 is a lens dedicated to driving a car, of the type described in the abovementioned French Patent Application 04 06 002. The lens is suited to a wearer having an addition prescription of 2.00 dioptres. The wearer's nominal power progression over the specialized lens is equivalent to 0.72 dioptre and is less than the wearer's addition prescription. The isopower and isoastigmatism maps show lines separated by 0.25 dioptre. The lens has a thickness in the centre of 2.07 mm; at the far vision level—the position of which is approximately 6° above the centre—the lens has a mean power of −0.02 dioptre and a resulting astigmatism of 0.04 dioptre. At the intermediate vision level, for a lowering of the gaze of approximately 33° and a nasal direction of approximately 6°, the mean power is 0.70 dioptre and the resulting astigmatism is 0.34 dioptre.

Figure 16:
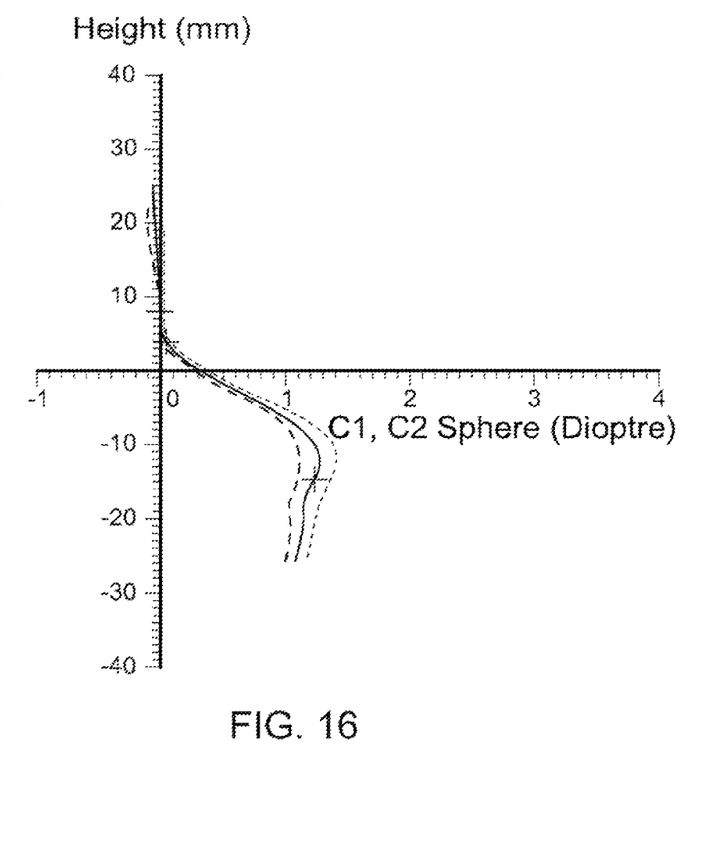
FIG. 16, a graph of the mean sphere along the meridian for the rear surface of a second clip-on according to the invention, making it possible to convert the optical function of the progressive lens of FIGS. 4 to 6 to that of the specialized lens of FIGS. 13 to 15.
Figure 17:
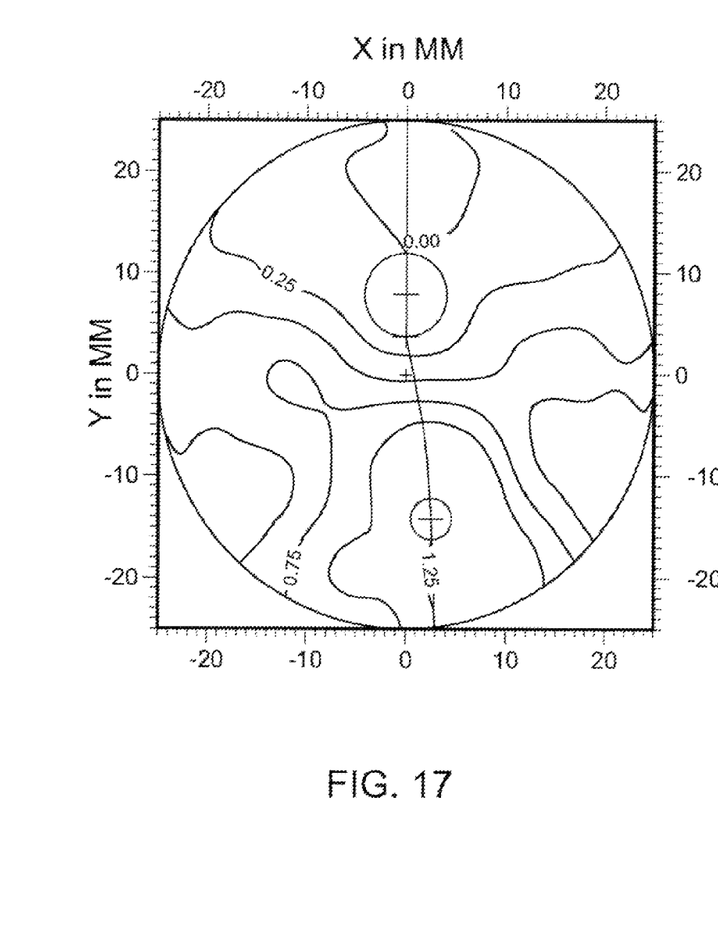
FIGS. 17 and 18, sphere and cylinder maps of the rear surface of the clip-on of FIG. 16.
Figure 18:
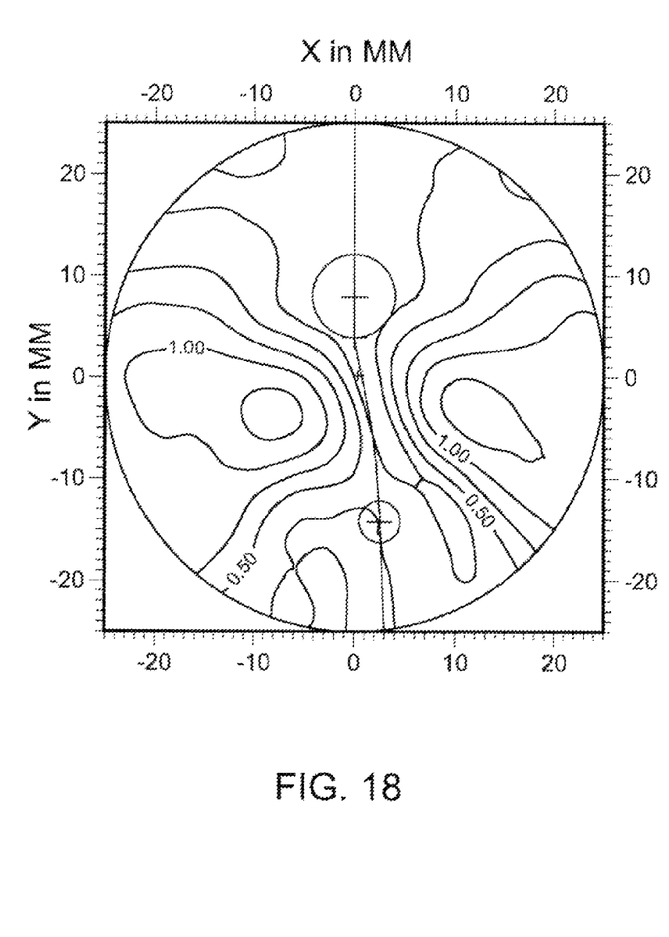

FIGS. 16 to 18 are similar to FIGS. 10 to 12. They show the characteristics of the rear surface of a second clip-on according to the invention, making it possible to convert the optical function of the progressive lens of FIGS. 4 to 6 to that of the second specialized lens of FIGS. 13 to 15. As in the preceding example, the clip-on has a spherical front surface and an afocal rear surface. The rear surface is optimized so as to ensure the optical function required for the assembly of the lens and the clip-on mounted on the lens. FIG. 16 shows a graph of the mean sphere along the meridian for the rear surface of the clip-on; the conventions are the same as in FIG. 10. The figure shows that the mean sphere in the upper part of the lens is substantially constant, and increases in order to reach a value of the order of 1.37 dioptres in the bottom part of the lens. At the coordinates point (0 mm, 8 mm) oil the lens, the mean sphere is 4.73 dioptres and the cylinder is 0.05 dioptres. At the coordinates point (0, 4 mm) in the reference (x, y), the mean sphere is 4.82 dioptres and the cylinder 0.08 dioptre. At the height of the control point for the intermediate vision of coordinates (2.561 mm, −14 mm) in the reference (x, y), the mean sphere is 6.10 dioptres and the cylinder is 0.30 dioptre.

The front surface of the clip-on is spherical and has a curvature of 4.74 dioptres. The clip-on is formed from the material referenced Orma supplied by Essilor, with an index of 1.502. The thickness of the clip-on is 1.50 mm.

FIGS. 17 and 18 show mean sphere and cylinder maps of the rear surface of the clip-on of FIG. 16, with the same notations as in FIGS. 11 and 12. The isocylinder and isosphere lines are drawn with a 0.25 dioptre step.

During mounting, it is sufficient for the precision of positioning of the clip-on with respect to the lens to be of the same order as that of a fitting cross of a progressive lens in front of the eye. This is easily obtained with the standard techniques for mounting the clip-ons on the frames. The calculation of the clip-on advantageously takes account of all the kinematics between the first dioptre (the front face of the clip-on in the example) and the eye.

The example of FIGS. 16 to 18 makes it possible to provide the wearer of the lens and clip-on assembly with the optical function of the lens described in FIGS. 13 to 15. As explained with reference to the first example, the use of an optical optimization for defining the clip-on ensures that the target optical function is effectively achieved when the wearer is provided with the lens and clip-on assembly.

Figure 19:
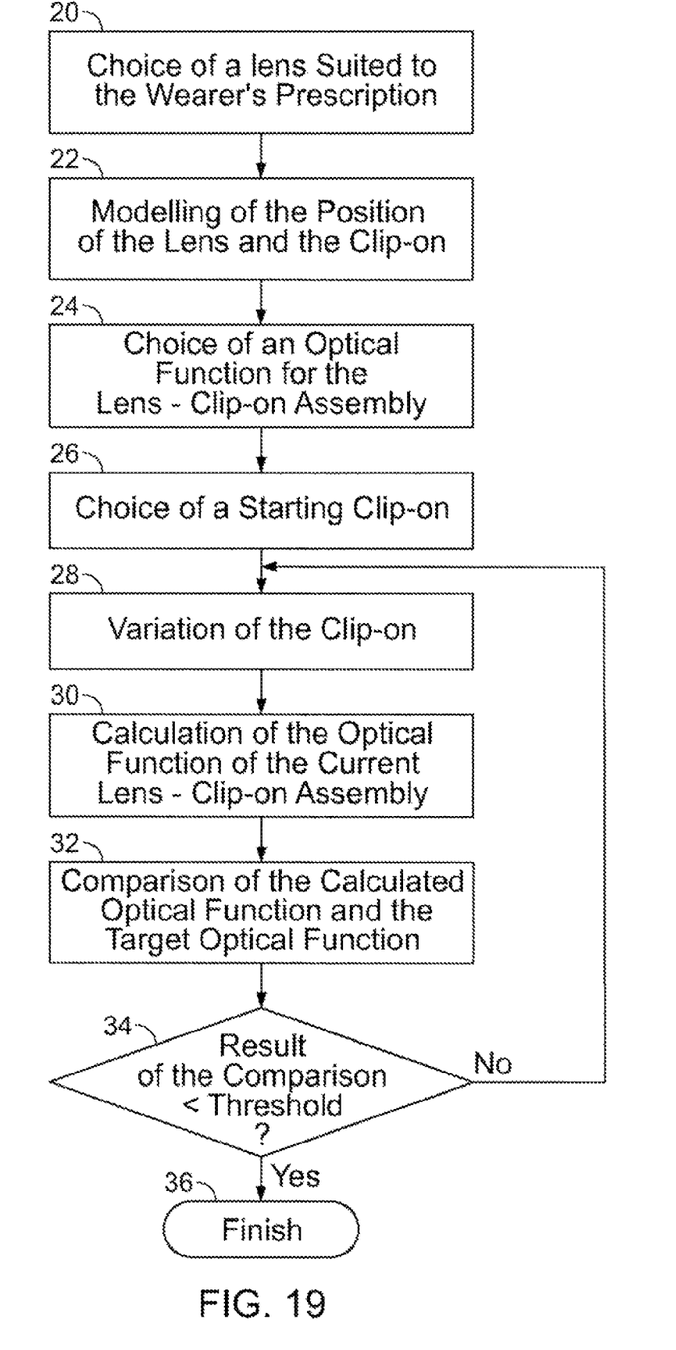
FIG. 19, a flowchart of the method of the invention.

FIG. 19 is a flow chart of the method of the invention. In Step 20, a lens 6 is chosen, suited to the wearer's prescription. This lens, in the examples proposed above, is the lens the optical function of which is represented in FIGS. 4 to 6.

In step 22, the position of the chosen lens 6 and of a clip-on 10 in front of the chosen lens is modelized. This can be carried out, as explained above, by considering a distance between the centre of rotation of the eye and the rear surface of the chosen lens, an angle of inclination and a curving contour. Standard values can be chosen, as above, or values suited to a given wearer under particular conditions. The position of the clip-on can also depend on the system for fixing the clip-on onto the frame of the chosen lens.

In step 24, an optical function for the chosen lens and clip-on assembly is chosen. In the examples, this step corresponds to the choice of the optical function of FIGS. 7 to 9 or 13 to 15.

In steps 26 to 34, the characteristics of the clip-on are calculated by optical optimization for a standard wearer, using the chosen optical function as optimization target. For this purpose, a starting clip-on is first chosen in step 26; it is possible for example to consider a clip-on having:

a spherical front surface 14,
a rear surface 12 modeled by an infinite curved surface of Zernicke polynomials, or by B-Spline modeling.

Zernicke polynomials are for example described in F. ZERNIKE, *Beugungstheorie des Schneidenverfahrens und seiner verbesserten Form, der Phasenkontrastmethode*, Physica, 1, p. 689-704, 1934. The references relating to B-Splines include C. De Boor, *A practical guide to Splines*, Applied Mathematical Sciences 27, Springer-Verlag, New- York, 333-359, 1978. The rear surface can press a mean sphere in the centre of the same value as the sphere of the front face of the lens; this facilitates correct positioning of the clip-on with respect to the lens and limits the total thickness of the lens and clip-on assembly. The starting clip-on can have a thickness between the two faces of 1.5 mm.

In step 28, the polynomials representing the rear surface of the clip-on can be varied. At the first iteration, the starting clip-on chosen in step 26 can be varied. For subsequent iterations, the current clip-on determined during the preceding iteration is considered.

In step 30, the optical function of the chosen lens and clip-on assembly is calculated by ray tracing, as modified in step 28.

In step 32, the optical function calculated in step 28 and the target optical function chosen in step 24 are compared. This comparison can be carried out by choosing points in the object space, i.e. directions of viewing, and summing the squares of the differences between the wearer power and the resulting astigmatism for each of the points chosen. The sum constitutes the "merit function" of the system used during the optimization. For example 1500 points distributed as follows in the object space can be chosen:

250 points along the meridian;
1250 points in the remainder of the object space.

In step 34, it is verified whether the result of the comparison is less than a threshold value. It is possible, in the preceding example, to consider a threshold value of $10^5$ dioptres$^2$—this threshold value being able to vary as a function of the sought optimization. If the result is not less than the threshold value, we go back to step 28. Otherwise we go to step 36, the clip-on being defined by the current values obtained.

For an optical function of the type of those discussed above, the clip-on is optimized in 15 iterations, with the abovementioned difference between the calculated optical function and the target optical function.

The clip-on thus defined is produced by a conventional technique, for example by moulding a polymer, or also by direct machining of the clip-on ("freeform" technique).

Of course, the present invention is not limited to the embodiments described by way of example; as mentioned above. For example, it is possible to optimize the front surface of the clip-on, or even distribute the optical function of the clip-on over the front surface and the rear surface of the latter.

Furthermore, for example, in the above examples, the same meridian was considered for all the simulations in order to analyze the different maps along the same vertical "section". This is only matter of an approximation which allows a comparison of the optical functions. In reality, the zones of vision are not centered identically between a standard progressive lens and a specialized lens. For example, Interview and Car-lens lenses are symmetrical, unlike a standard progressive lens the near vision zone of which is nasally off-centre. The clip-on also makes it possible to relocate the zones of vision, in order to convert for example from a standard progressive lens with off-centre near vision to an assembly having the optical function of a specialized lens without moving the near vision zone off-centre. It is therefore understood that the optimization can be carried out not only by modifying the power and astigmatism targets in the object space, but also by modifying the meridian.

In the optimization examples, a clip-on with power variations over one of the faces was considered. The use of refractive, diffractive or gradient-index elements is also mentioned for the clip-on. Similarly, the invention applies whatever the realization of the optical function of the base lens—distribution of the optical function over one or both surfaces of the initial lens, use of refractive, diffractive or gradient-index elements.

Additional embodiments are also within the scope of the following claims.

What is claimed is:

1. A method for defining a supplementary face for spectacles, the method comprising:
    choosing a progressive lens suited to a wearer's prescription;
    modeling a position of the chosen lens and a position of a supplementary face in front of the chosen lens;
    choosing an optical function for the assembly of the chosen lens and the supplementary face;
    calculating characteristics of the supplementary face by optical optimization for a wearer based on the chosen optical function, wherein the calculating further comprises comparing calculated characteristics with target characteristics.

2. The method according to claim 1, in which the calculation step is carried out by optimization of a surface of the supplementary face.

3. The method according to claim 2, in which the optimized surface is the surface of the supplementary face adjacent to the lens.

4. The method according to claim 2, in which the supplementary face comprises an additional surface other than the optimized surface, the additional surface being spherical.

5. The method of claim 1, in which the supplementary face and the lens are incorporated in spectacles comprising:
    a detachable mounting device, suited to a detachable mounting of the supplementary face in front of the lens of the spectacles;
    a surface of the spectacles having an area being at least equal to an area of the entire surface of the lens;
    a continuous optical power variation over the surface of the spectacles.

6. The method according to claim 5, in which the supplementary face has a thickness in the centre less than or equal to 2.5 mm.

7. The method according to claim 5, in which the supplementary face comprises surfaces and has a surface treatment on at least one of its surfaces.

8. The method according to claim 5, in which the spectacles comprise spectacle frames and the lens is mounted on the spectacle frames.

9. The method according to claim 8, in which:
    the lens comprises an optical or geometric centre;
    the supplementary face comprises a front surface including a first sphere and a rear surface including a second sphere equal to the first sphere at the centre of the lens.

10. The method according to claim 1, in which the optical function comprises a continuous optical function over an entire surface of the chosen lens.

11. The method according to claim 1, in which the supplementary face comprises a surface covering an entire surface of the chosen lens.

* * * * *